M. A. SMITH.
LENS.
APPLICATION FILED APR. 2, 1917.

1,273,192.

Patented July 23, 1918.

INVENTOR

UNITED STATES PATENT OFFICE.

MAURICE A. SMITH, OF JEANNETTE, PENNSYLVANIA, ASSIGNOR TO McKEE GLASS COMPANY, OF JEANNETTE, PENNSYLVANIA, A CORPORATION OF PENNSYLVANIA.

LENS.

1,273,192.  Specification of Letters Patent.  Patented July 23, 1918.

Application filed April 2, 1917.  Serial No. 159,188.

*To all whom it may concern:*

Be it known that I, MAURICE A. SMITH, a citizen of the United States, and resident of Jeannette, in the county of Westmoreland and State of Pennsylvania, have invented a new and useful Improvement in Lenses; and I do hereby declare the following to be a full, clear, and exact description thereof.

My invention relates to lenses for automobile headlights or other purposes to which they may be found applicable.

The object of my invention is to provide a lens of this character in which the light rays are directed sidewise for lighting the side of the road, as well as for turning corners, and providing for the direction of light rays forwardly and downwardly for a suitable distance and at proper height to prevent dazzling the eyes of pedestrians, the light rays in no case being directed above the top of the headlight.

Figure 1:
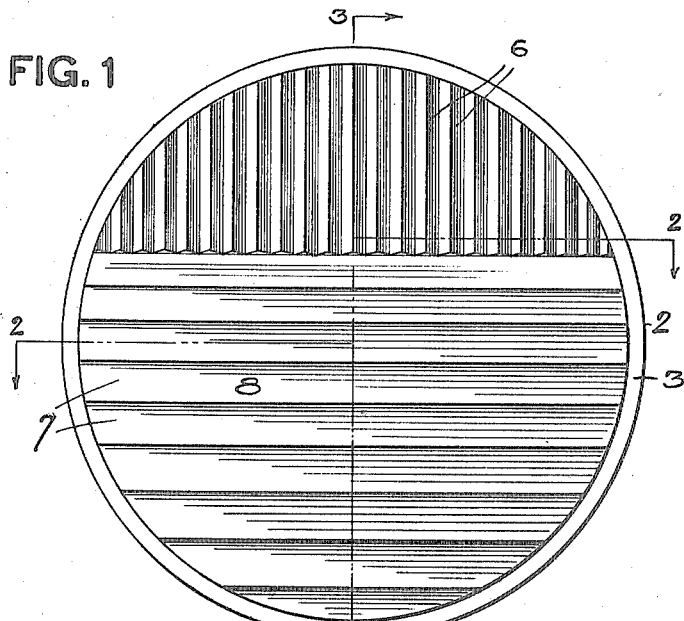
Figure 2:
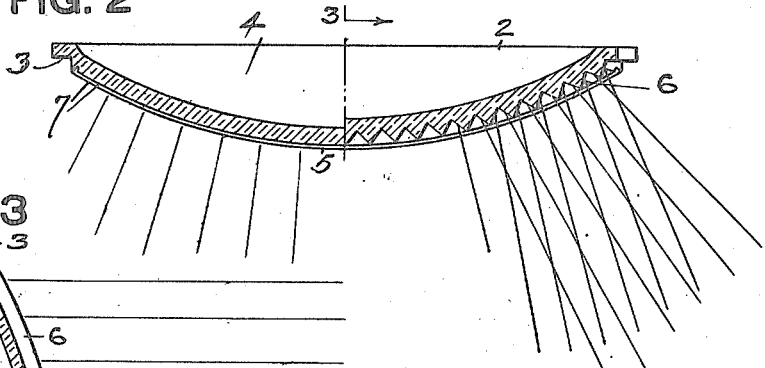
Figure 3:
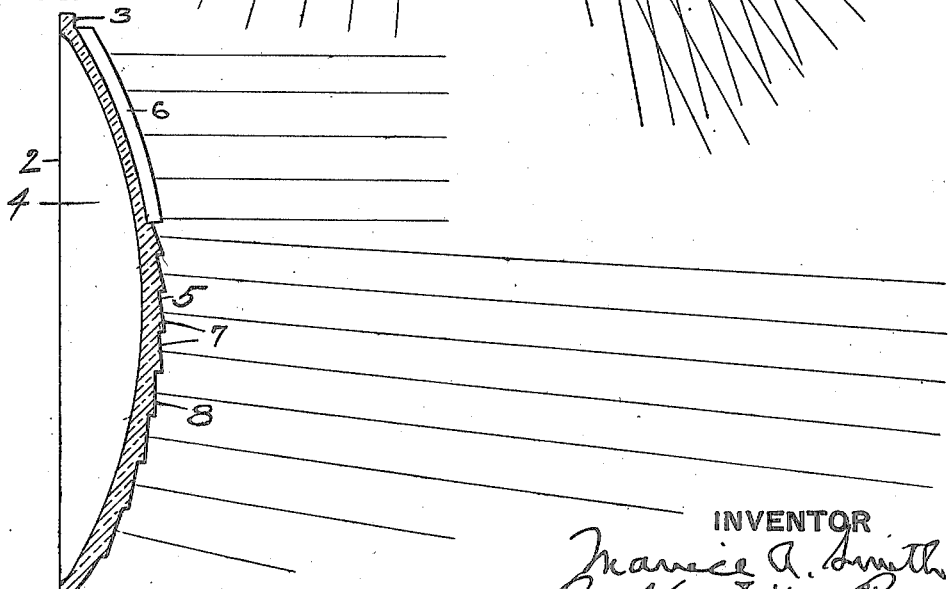

In the accompanying drawing, Figure 1 is a face view of my improved lens; Fig. 2 is a section taken on the line 2—2, Fig. 1, looking downwardly; and Fig. 3 is a section on the line 3—3, Fig. 1.

The numeral 2 designates my improved lens which is made of a glass of suitable thickness with the rim 3 for securing the lens within the headlight. The lens is concave on its inner face as at 4, and convex, as at 5, on its outer face.

The upper portion of the lens for a suitable distance and preferably less than half of the area of the lens is provided with the vertical triangular prisms 6 the outer ones of which act to direct the light rays sidewise as indicated in Fig. 2, the light on passing through the glass being refracted by the prisms according to the well-known laws of light. The inner or central group of these vertical prisms give substantially total reflection so that there is practically no lateral dispersion of light from this central group.

Below the vertical prisms 6 are the horizontal prisms 7 arranged in the form of bands with flat faces 8. The lower end of one prism or band projects out beyond the upper end of the succeeding lower band, and in this manner a stepped effect is given as shown in Fig. 3. The faces 8 increase in length as they approach the bottom of the lens. The effect of these horizontally-arranged prisms or bands is to direct the light downwardly as indicated in Fig. 3, but at the same time, projecting the light sufficient distance to give the lighting effect for the required distance, and at the same time confining the light rays to a height which will not dazzle or confuse the pedestrian.

By my invention, therefore, I provide a lens which is very simple in construction and one in which the light rays are diffused sidewise due to the arrangement of the vertical triangular prisms on its upper portion to give the necessary lighting for the sides of the road, as well as in turning corners, and in which the light rays in the lower portion are directed downwardly at the proper angle to give sufficient distance lighting.

What I claim is:

1. In a lens having a concave inner and convex outer face, a series of vertically-disposed triangular prisms at the upper portion of said outer convex face whereby the light rays are diffused laterally by the outer ones of said prisms and the inner or central ones give substantially total reflection, and below the same horizontally-arranged prisms comprising a series of stepped bands with flat faces.

2. In a lens having a concave inner and convex outer face, a series of vertically-disposed triangular prisms at the upper portion of said convex face for less than one-half the area of said lens whereby the light rays are diffused laterally by the outer ones of said vertically-arranged prisms and the inner or central ones give substantially total reflection, and below the same horizontally-arranged prisms consisting of bands with flat faces, the lower end of one band projecting out beyond the upper end of the succeeding lower band.

In testimony whereof, I the said MAURICE A. SMITH, have hereunto set my hand.

MAURICE A. SMITH.

Witnesses:
 D. M. SMITH,
 D. B. PUKEY.